N. W. MOHR.
COMBINED AEROPLANE AND DIRIGIBLE BALLOON.
APPLICATION FILED APR. 16, 1910.

1,064,240.

Patented June 10, 1913.

5 SHEETS—SHEET 1.

Witnesses
Roswell P. Rogers.
E. R. Blake

Inventor
N. W. Mohr.

by, Carlos P. Griffin Atty.

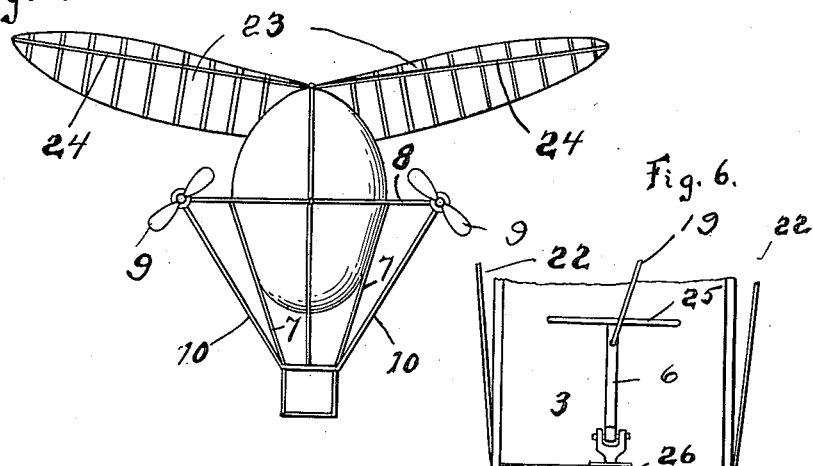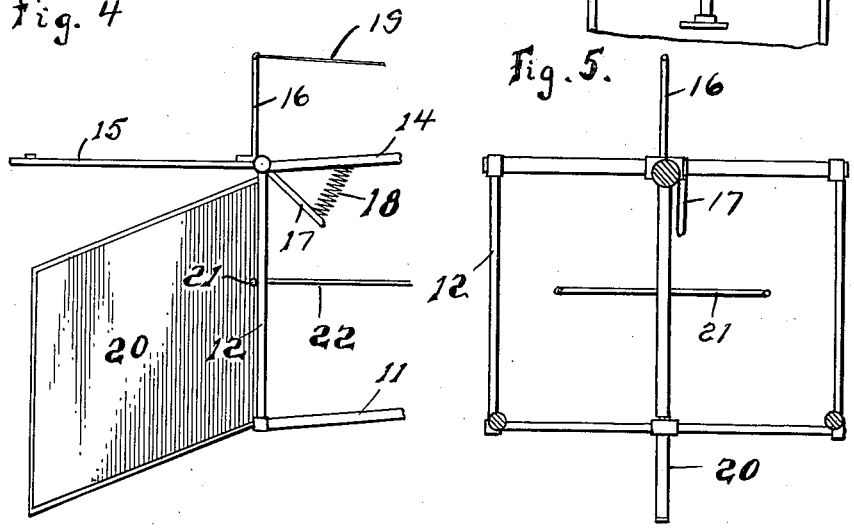

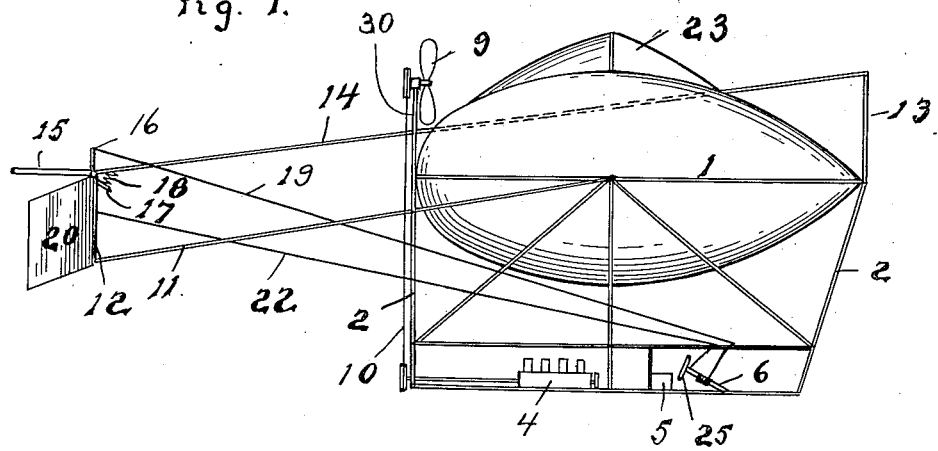
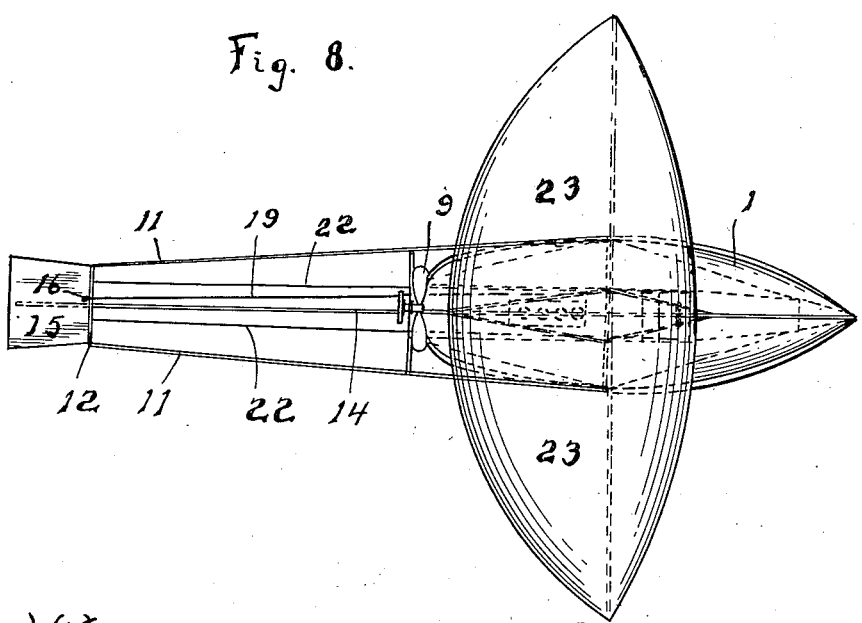

N. W. MOHR.
COMBINED AEROPLANE AND DIRIGIBLE BALLOON.
APPLICATION FILED APR. 16, 1910.

1,064,240.

Patented June 10, 1913.

5 SHEETS—SHEET 4.

Witnesses
Roswell P. Rogers.
E. R. Blake

Inventor
N. W. Mohr,
by, Carlos P. Griffin Atty.

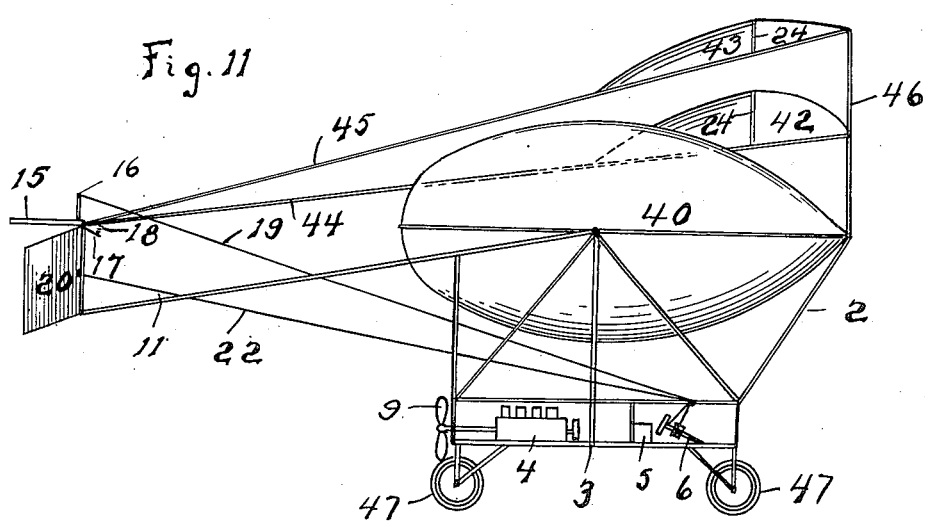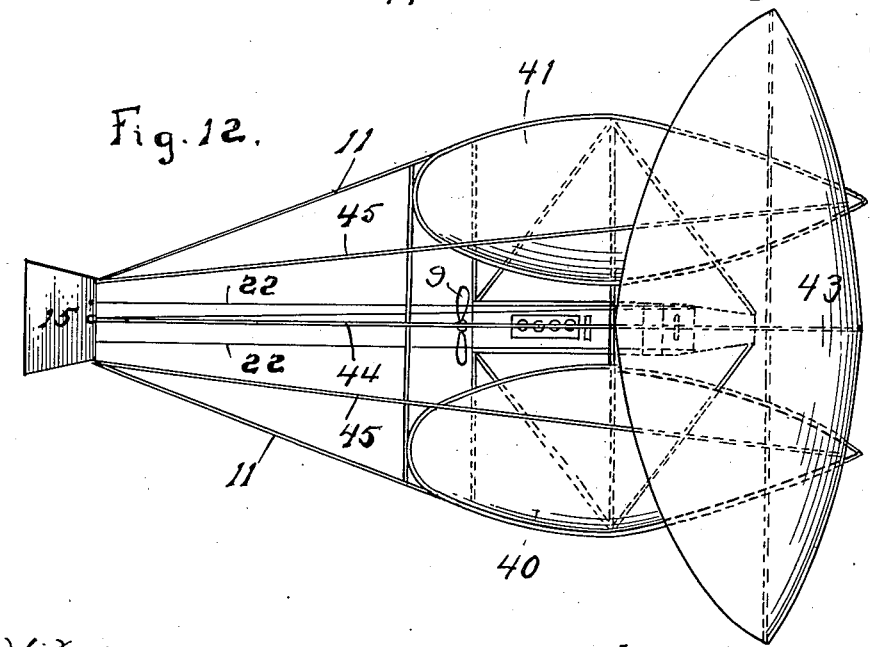

UNITED STATES PATENT OFFICE.

NORMAND W. MOHR, OF SAN FRANCISCO, CALIFORNIA.

COMBINED AEROPLANE AND DIRIGIBLE BALLOON.

1,064,240.  Specification of Letters Patent.  Patented June 10, 1913.

Application filed April 16, 1910. Serial No. 555,971.

*To all whom it may concern:*

Be it known that I, NORMAND W. MOHR, a citizen of the United States, residing at San Francisco, in the county of San Francisco and State of California, have invented a new and useful Combined Aeroplane and Dirigible Balloon, of which the following is a specification in such full and clear terms as will enable those skilled in the art to construct and use the same.

This invention relates to a dirigible balloon and aeroplane combined, and its object is to combine an aeroplane with a gas field whereby the size of each of the said parts may be reduced from that ordinarily used with such machines.

It will be understood by those skilled in the art, that wherever a purely dirigible balloon is used, the size of the gas field must be so large as to make the balloon very unwieldy. It will also be understood by those skilled in the art, that where aeroplanes are used without a gas field, their area must be so considerable as to make the entire machine very frail.

The object therefore, of the present invention is to combine the plane effect and gas field, whereby, the size of each of the components of the flying machine may be reduced, that is to say, the supporting gas field is made only large enough to barely support the weight of the machine, and small enough so that it may easily be directed, while the aeroplanes are made smaller than they would be in a pure aeroplane machine, this making it possible to make it very substantial.

Figure 1:
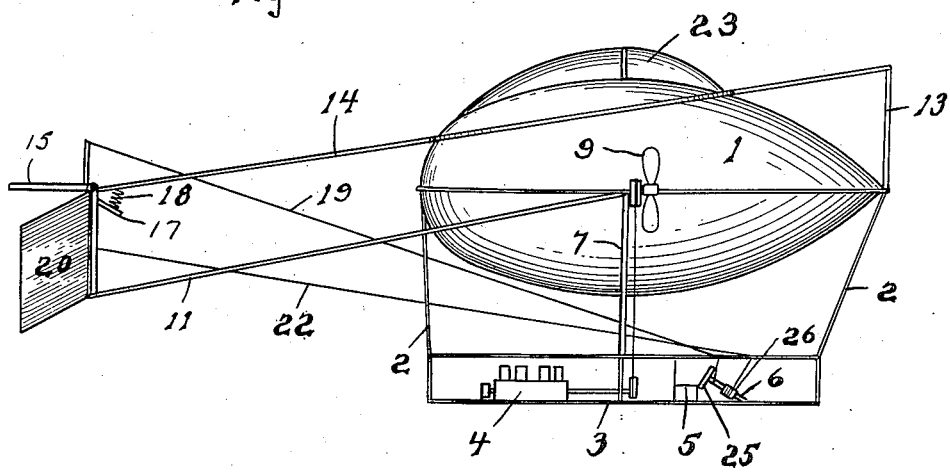
Figure 2:
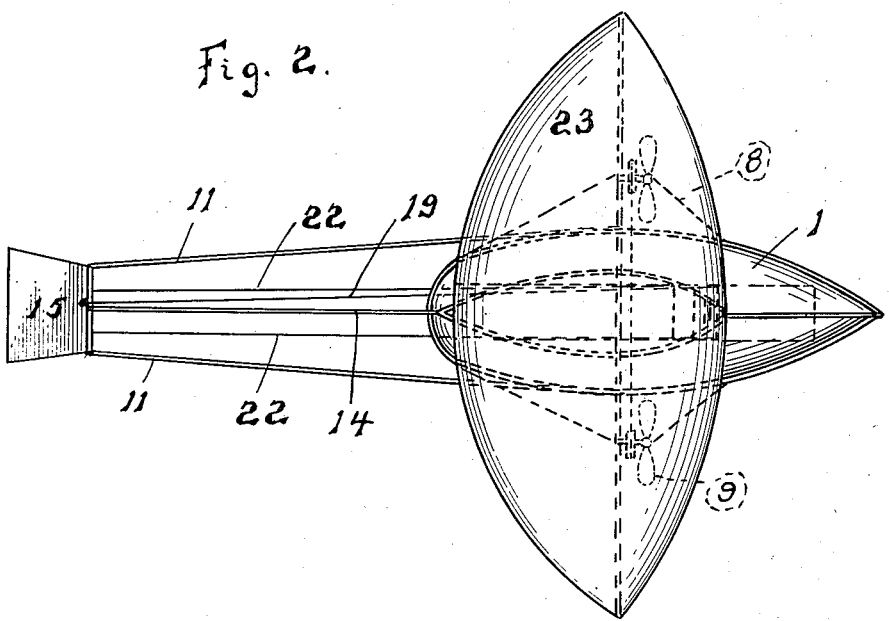
Figure 9:
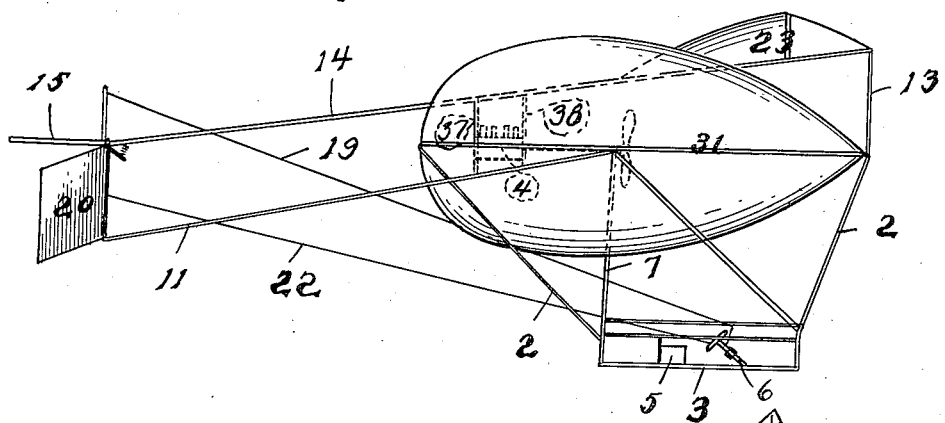
Figure 10:
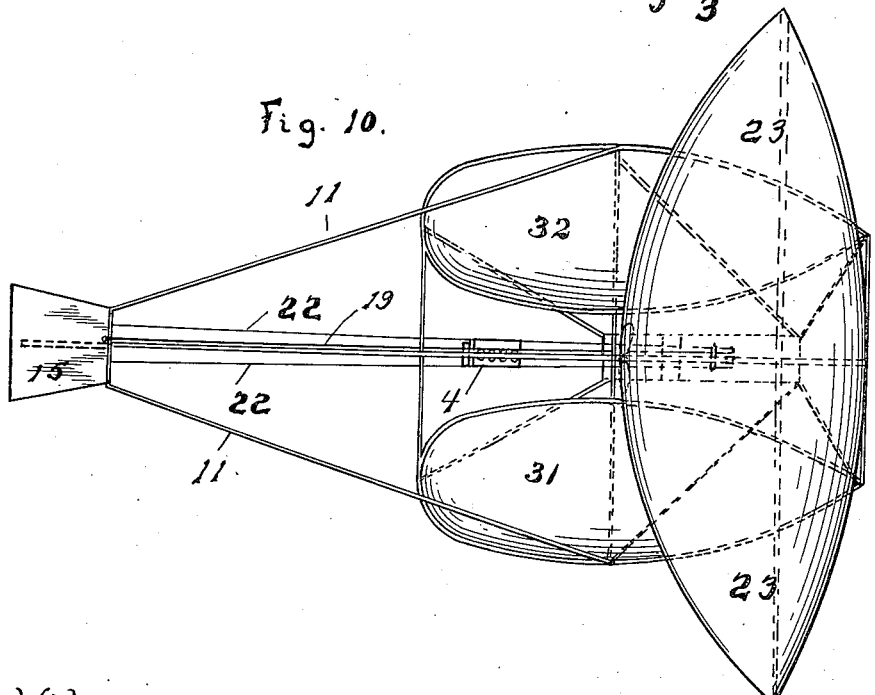

In the drawings in which the same numeral of reference is applied to the same portion throughout the several views, Figure 1 is a side elevation of one form of the flying machine, Fig. 2 is a plan view of the same, two propellers being used in this machine to drive the same forward, Fig. 3 is a front elevation of the machine. Fig. 4 is a side view of the tail and steering gear, showing the manner of operating the same. Fig. 5 is a view from front to rear in elevation of the tail, and showing the means for steering the rudder, and for lifting and depressing the horizontal tail plane. Fig. 6 is a view illustrating the manner of operating the steering mechanism. Fig. 7 is a side elevation of the form of the machine having but a single propeller. Fig. 8 is a plan view of the same machine. Fig. 9 is a side elevation of another form of the invention. Fig. 10 is a plan view of the form of the invention shown in Fig. 9. Fig. 11 is a side elevation of one form of the invention, in which a double set of aeroplanes are used. Fig. 12 is a plan view of the form of the invention shown in Fig. 11. In Figs. 7 to 12, both inclusive, the details for operating the machine are substantially the same as the details for the form of the invention shown in Figs. 1 to 6.

The numeral 1 is applied to the gas bag which is of an ovoid shape, and which is secured to a frame-work 2, which supports the car 3, on which the engine 4, seat 5, and steering gear 6 are placed. Extending upwardly from the car on each side thereof is a brace or support 7, having the upper ends thereof connected by means of a horizontal frame 8 which extends around the gas field and projects beyond support 7 far enough to support the propellers 9 at each side of the gas field, said propellers being driven from the engine by means of belts 10.

It will be observed that the frame 8 extending entirely around the gas field and to which said gas field is secured, forms a means for holding the gas bag extended, should it collapse for any reason. The result of this construction is that the gas bag will act as a parachute, should the gas escape therefrom.

Extending rearwardly from the gas field and connected with the supports 7 and 2 are two long bars 11, said bars extending to the tail frame 12 and connecting therewith its lower portion.

Extending upwardly from the front end of the gas bag is a rod 13, from the upper end of which two long rods 14 extend to the upper portion of the tail frame 12. It will be understood by those skilled in the art that considerable bracing is connected with the rods 11 and 14 to make them as rigid as may be necessary to operate propeller, but such bracing is not shown in this drawing for the sake of clearness. The tail frame is rectangular in shape, and has a horizontal plane 15 pivoted thereto, said plane having an arm 16 and an arm 17. A spring 18 operates and causes the plane to be depressed, while the rope 19 running to the steering gear permits the operator to raise the plane 15 at will. The tail frame also has pivoted thereon a vertical plane 20, to which plane is secured a rod 21, extending on both sides of said plane and to which the steering rope 22 is secured, said steering rope running to the steering gear 6 on the car, both the planes being operated from the steering gear by two movements thereof, as will be later explained.

Secured to the long rods 14 at points at which they leave the gas field are two aeroplanes 23, said planes being of any desired material or construction, and being held extended by means of rods 24. The steering mechanism comprises a revoluble post 6 having a steering wheel 25, to which the ropes 22 lead, said ropes extending around the drum 26 in the opposite direction, whereby when the post 6 is rotated one rope will be unwinding while the other is winding up. The ropes extend from opposite sides of the machine, and will permit without slackening considerable angular movement of the post 6, so that as the rope 19 is connected with the post 6 at the upper end thereof, it is possible to raise the plane 15 by depressing the post 6, said rope 19, being connected with a loose collar 19' on the post 6. It is thus possible to shift either of the tail planes in either direction without interfering with the operation of the other, or at the same time, both may be shifted should it be so desired. An advantage of this form of construction is, that the center of gravity of the heavy parts of the machine is below the supporting gas field and planes and since the gas field is large enough to carry the larger part of the weight, at least, the tendency of the machine will be to remain upright, instead of being liable to overturn at any instant, as with an aeroplane.

In Figs. 7 and 8 there is shown a similar machine save that the machine is provided with but a single propeller and that is placed above the gas field and to the rear of the aeroplane. In this form of the invention the frame work of the machine is substantially the same as in the previously mentioned forms, save that the propeller is supported by means of a long rod 30, which passes up from the car closely adjacent the rear of the gas field, 1, said propeller being driven by means of a belt, the same as the propellers in the first form of the invention.

In Figs. 9 and 10 there is shown still another form of the invention, in which two gas fields are used, said gas fields being indicated at 31 and 32, and having a framing substantially similar to the frame illustrated in the first form of the invention, save that the engine is supported at the level of the propeller, and between the two gas fields, said engine being directly supported by braces 37 and 38, from the longitudinal rod 14. The advantage of this form of the invention is that its capacity would be considerably increased, at the same time not greatly increasing its unwieldiness.

In Figs. 11 and 12 there is shown a further modification, in that the two gas fields 40 and 41 are used, and two supporting planes 42 and 43 are connected with the longitudinal extending rods 44 and 45, and rod 46 at the front of the machine supporting said planes at the desired level above the gas fields.

Since it is necessary to start such machines as this by moving them along the ground for a considerable distance, wheels 47 are provided at each of the four corners of the car, thus making it possible to move the machine along the ground either in starting or alighting. In all other ways, this invention is the same as that shown in Figs. 1 to 6.

The width of the machine is considered to be that dimension at right angle to the line of flight thereof, by the length of the machine it is considered that the line of flight be parallel to the line of flight thereof.

Having thus described my invention, what I claim as new and desire to secure by Letters Patent of the United States, is as follows:

1. In a flying machine, a frame, a gas field adapted to support a portion of the weight of flying machine, aeroplanes the dimensions of which are greater transverse to the gas field than in the length of the machine secured to said frame and to said gas field above the center of the gas field and extending on both sides thereof, propellers adapted to drive said machine forward, a motor adapted to drive said propellers and secured to the frame, bars extending rearwardly from the said frame and gas field, a vertically extending plane carried by said bars at a distance from the gas field, means to move said plane about a vertical axis, a tail plane secured to said frame over the said vertically extending plane, and means to turn said tail plane about a horizontal axis, substantially as described.

2. In a flying machine, a frame, a gas field secured to said frame and adapted to support a portion of the weight thereof, an aeroplane secured to the frame and extending above and on both sides of the gas field, said gas field being longer than the dimension of the aeroplane parallel to the length of the machine, a propeller to drive the machine forward, a motor on the frame to drive the propeller, a rearwardly extending tail supporting frame, a vertically extending rudder plane and a plane over the rudder plane and pivoted on a substantially horizontal axis, said planes being at a distance from the gas field, substantially as described.

3. In a flying machine, a frame, a gas field secured to said frame and adapted to support a portion of the weight thereof, an aeroplane secured to the frame and extending outwardly on both sides of the gas field, said plane having a shorter dimension parallel to the length of the machine than the same dimension of the gas field, a propeller to drive the machine forward, a motor to drive the propeller, a rudder plane at the rear of the frame movable on a vertical axis, a plane above the rudder plane and movable on a horizontal axis, each of the tail planes being at a distance from the gas field, and means to move either or both of the steering planes at will, substantially as described.

In testimony whereof I have hereunto set my hand this 18 day of March A. D. 1910, in the presence of the two subscribed witnesses.

NORMAND W. MOHR.

Witnesses:
J. H. STIRLING,
C. P. GRIFFIN.